United States Patent
Bert (10) Patent No.: US 11,983,107 B2
(45) Date of Patent: *May 14, 2024

(54) ENHANCED FILESYSTEM SUPPORT FOR ZONE NAMESPACE MEMORY

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,497

(22) Filed: Jan. 25, 2023

(65) Prior Publication Data

US 2023/0168997 A1    Jun. 1, 2023

Related U.S. Application Data

(63) Continuation of application No. 16/695,481, filed on Nov. 26, 2019, now Pat. No. 11,593,258.

(51) Int. Cl.
| | | |
|---|---|---|
| *G06F 12/02* | (2006.01) | |
| *G06F 3/06* | (2006.01) | |
| *G06F 12/0844* | (2016.01) | |

(52) U.S. Cl.
CPC ........ *G06F 12/0246* (2013.01); *G06F 3/0614* (2013.01); *G06F 3/0647* (2013.01); *G06F 3/0679* (2013.01); *G06F 12/0284* (2013.01); *G06F 12/0844* (2013.01); *G06F 2212/7207* (2013.01)

(58) Field of Classification Search
CPC .... G06F 3/0614; G06F 3/0647; G06F 3/0679; G06F 3/0659; G06F 3/0604; G06F 12/0246; G06F 12/0284; G06F 12/0844; G06F 12/10; G06F 2212/7207; G06F 2212/657

See application file for complete search history.

(56) References Cited

U.S. PATENT DOCUMENTS

| | | |
|---|---|---|
| 2010/0138606 A1 | 6/2010 | Tanaka |
| 2011/0276744 A1 | 11/2011 | Sengupta |
| 2013/0080732 A1 | 3/2013 | Nellans |
| 2013/0250686 A1 | 9/2013 | Marukame |

(Continued)

FOREIGN PATENT DOCUMENTS

| | | |
|---|---|---|
| EP | 2715510 B1 | 5/2018 |
| KR | 10-1835604 | 3/2018 |

OTHER PUBLICATIONS

International Search Report and Written Opinion for International Application No. PCT/US2020/061540, dated Mar. 15, 2021, 9 pages.

*Primary Examiner* — Michael Krofcheck
(74) *Attorney, Agent, or Firm* — Lowenstein Sandler LLP (57) ABSTRACT

A processing device in a memory sub-system identifies a first memory device and a second memory device and configures the second memory device with a zone namespace. The processing device identifies a first portion and a second portion of the first memory device, the first portion storing zone namespace metadata corresponding to the zone namespace on the second memory device. The processing device further exposes the second portion of the first memory device to a host system as a non-zoned addressable memory region.

20 Claims, 5 Drawing Sheets

(56) References Cited

U.S. PATENT DOCUMENTS

| | | |
|---|---|---|
| 2016/0132265 A1* | 5/2016 | Yi .................... G06F 3/0614 |
| | | 711/105 |
| 2018/0246670 A1 | 8/2018 | Baptist |
| 2019/0034098 A1 | 1/2019 | Gole |
| 2020/0089407 A1 | 3/2020 | Baca |
| 2020/0141775 A1 | 5/2020 | Muir |
| 2021/0081330 A1 | 3/2021 | Bennett |
| 2021/0089217 A1 | 3/2021 | Bjørling |
| 2021/0141433 A1 | 5/2021 | Watt |
| 2021/0141775 A1 | 5/2021 | Keymolen et al. |

* cited by examiner

ENHANCED FILESYSTEM SUPPORT FOR ZONE NAMESPACE MEMORY

RELATED APPLICATIONS

This application is a continuation of U.S. patent application Ser. No. 16/695,481, filed Nov. 26, 2019, the entire contents of which are hereby incorporated by reference herein.

TECHNICAL FIELD

Embodiments of the disclosure relate generally to memory sub-systems, and more specifically, relate to enhanced file system support for zone namespace memory.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to enhanced file system support for zone namespace memory in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can include multiple memory devices that can store data from a host system. One example of a non-volatile memory device is a negative-and (NAND) memory device. Other examples of non-volatile memory devices are described below in conjunction with FIG. 1. The memory sub-system includes a memory sub-system controller that can communicate with the memory devices to perform operations such as reading data, writing data, or erasing data at the memory devices and other such operations. A memory sub-system controller is described in greater below in conjunction with FIG. 1.

The host system can send access requests (e.g., write commands, read commands) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. The metadata and host data, together, is hereinafter referred to as "payload." Metadata, host data, and parity data, which is used for error correction, can collectively form an error correction code (ECC) codeword. Metadata can also include a data version (e.g., used to distinguish age of data written), valid bitmap (specifying which LBAs or logical transfer units contain valid data), etc.

Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and have two logic states.

The memory sub-system can initiate media management operations, which can include executing, for example, a write operation or read operation, on host data that is stored on a memory device. For example, the memory sub-system may re-write previously written host data from a location on a memory device to the same location or a new location as part of a write refresh operation. In another example, the media management operations can include a re-read of host data that is stored on a memory device as part of a read refresh operation. "User data" hereinafter generally refers to host data and data that is re-written as part of media management. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

In certain implementations, a filesystem can be used as a means to organize the user data on the memory device or devices of the memory sub-system by providing procedures to store, retrieve and update the data, as well as manage the available space on the memory device or devices. A filesystem organizes data in an efficient manner and can be tuned to the specific characteristics of the memory device. Filesystems are used on various types of data storage devices to maintain the physical locations of computer files. Filesystems generally allocate space in a granular manner, usually using multiple physical units on the memory device. Filesystems are responsible for organizing files and directories, and keeping track of which areas of the device belong to certain files and which are not being used. Filesystems contain data blocks storing the actual data from an application or operating system running on the host system, as well as metadata blocks. This filesystem metadata contains information about the design, structure and layout of the data structures used to store the actual data. In other implementations, object storage can be used in place of a filesystem. For example, is certain large scale computing implementations, objects can be used in place of a file when the features of those objects are more suitable (e.g., the presence of comprehensive metadata stored with the file eliminating the tiered file structure associated with filesystems).

Certain memory devices are also configured with a zone namespace. In a zone namespace, the address space of the memory device is divided into zones which allows for more efficient management of data as the capacity of the memory device increases. Host systems designed to work with conventional filesystems may face certain challenges when interacting with a memory device having a zone namespace, however. For example, conventional filesystems can write data in blocks as small as 4 kilobytes (KB) in size, while a zone namespace memory device can have an optimal write size that is in the range of approximately 100 KB (e.g., 64 KB, 128 KB, 196 KB). While the data portion of filesystem writes can be adjusted to accommodate such granularities, this is not necessarily true for filesystem metadata writes that are significantly smaller in size. In addition, with a zone namespace, writes are performed sequentially starting from the beginning of each zone. Many filesystems utilize a write in place approach (i.e., a random write), often with smaller granularity than is optimal for a zone namespace. In zone namespaces, however, data within a zone typically cannot be arbitrarily overwritten. Instead, the zone write pointer is usually reset, effectively deleting the data in the zone and writing of data can be restarted from the beginning of the zone.

Thus, in order to enable the use of zone namespace memory devices with conventional filesystems, certain costly modifications may be required. In general, the host computing system can modify the write size granularity for regular data without much difficulty so that data is accumulated in to larger chunks based on the optimal write size of the zone namespace. Since the host metadata is so much smaller, however, and must be written to the memory device with the corresponding regular data, certain memory devices are configured to include a non-volatile dual in-line memory module (NVDIMM), for example, where the host metadata can be written. The NVDIMM can include a number of dynamic random access memory (DRAM) devices that can accept the host metadata from the filesystem in smaller write sizes and store that host metadata temporarily until the optimal write size of the zone namespace is reached and then flush the host metadata to the underlying main storage media (e.g., NAND). The addition of this NVDIMM adds significant cost increases to the memory sub-system and consumes at least one additional available memory slot. Other solutions attempt to modify the filesystem to abide by the rules of the zone namespace, but such changes can be complex and invasive, making them unlikely to gain market acceptance. Still other solutions attempt to create a conventional namespace on the memory sub-system in addition to the zone namespace, so that write operations of any size can be performed. This solution, however, can lead to inefficient use of the memory capacity, can be complex to implement, and can lack adaptability, as the size of each namespace would have to be predetermined at configuration time.

Aspects of the present disclosure address the above and other deficiencies by providing enhanced file system support for zone namespace memory devices. Compared to a conventional filesystem, a zone namespace can be implemented using a significantly smaller amount of zone namespace metadata (e.g., address mapping tables). Since the zone namespace uses a larger write size granularity and enforces sequential writes, the amount of zone namespace metadata required is simply less than that of a non-zoned memory sub-system of comparable size. Accordingly, less capacity on the memory device is needed to maintain the zone namespace metadata for the zone namespace. For example, a zone namespace memory device having a capacity of 16 terabytes (TB) might only require around 50 megabytes (MB) of zone namespace metadata, while a conventional memory device might require around 16 GB of metadata. The zone namespace memory device can still include some DRAM to store the zone namespace metadata. Since, in most implementations, the smallest DRAM device available will be approximately 1 GB in size or larger, approximately 90% or more of the DRAM remains available for other uses.

Certain memory sub-systems include a feature known as persistent memory regions (PMR), which allows the memory sub-system to expose internal DRAM (or other volatile memory) to the host system. The DRAM is uncacheable, and thus cannot be used for runtime operations, but would be nonvolatile (by virtue of a capacitor or other battery), and thus, can be used as a nonvolatile buffer. In addition, the PMR from multiple memory sub-systems can be exposed to the host system as a single larger memory having a capacity equal to the total of all the individual PMR contributions. Accordingly, in one embodiment, the memory sub-system can expose, via PMR, the unused portion of the DRAM (herein referred to as "PMR free space"), thereby allowing the host system to register that PMR free space as uncacheable PCIe memory. The PMR free space functions effectively as an NVDIMM in the memory sub-system that can be used to support metadata management. There is no extra cost since the DRAM is already present in the memory sub-system, and will not consume any additional PCIe slots. Given this availability of persistent memory, any changes to the filesystem can be relatively minor. For example, the filesystem can continue to make metadata writes in 4 KB block sizes to the PMR free space for temporary buffering. Once the amount of metadata in the PMR free space reaches the optimal write size for the zone namespace, the memory sub-system can issue a zone write of the metadata from the PMR free space to the main memory (e.g., NAND). In other embodiments, other non-volatile storage technologies can be used to provide the PMR functionality in place of a DRAM with a power supply. For example, ferroelectric random access memory (FeRAM), magneto random access memory (MRAM), or three-dimensional cross-point ("3D crosspoint") memory devices that are a cross-point array of non-volatile memory that can perform bit storage based on a change of bulk resistance, in conjunction with a stackable cross-gridded data access array, can be used.

In the event of a power failure, the memory sub-system can use the back-up power (e.g., from a capacitor or other battery) to dump data from the PMR free space into NAND. The data in the PMR free space in this instance can include both metadata, as well as metadata journals for roll back. When power is restored, the memory sub-system can restore the data to the PMR free space by retrieving it from NAND.

The filesystem will be mounted and, as part of crash recovery, will check the PMR signature and retrieve all metadata and journals that were previously saved to be able to restore the entire filesystem. Thus, the changes to both the filesystem and the memory sub-system are limited, and will not significantly impact the cost of the memory sub-system, while still providing substantial new capabilities. For example, a zone namespace can be implemented in a memory sub-system which utilizes less metadata than a conventional filesystem. Accordingly, less capacity of the memory sub-system is reserved for metadata and more capacity can be provided to the host system. In addition, by utilizing the DRAM in the memory sub-system for multiple purposes (i.e., to store the zone namespace metadata and as a non-volatile buffer for host data), the design of the memory sub-system is simplified, preventing the need for additional discrete memory devices. Furthermore, resistance to power loss is provided in an otherwise volatile memory sub-system.

Figure 1:
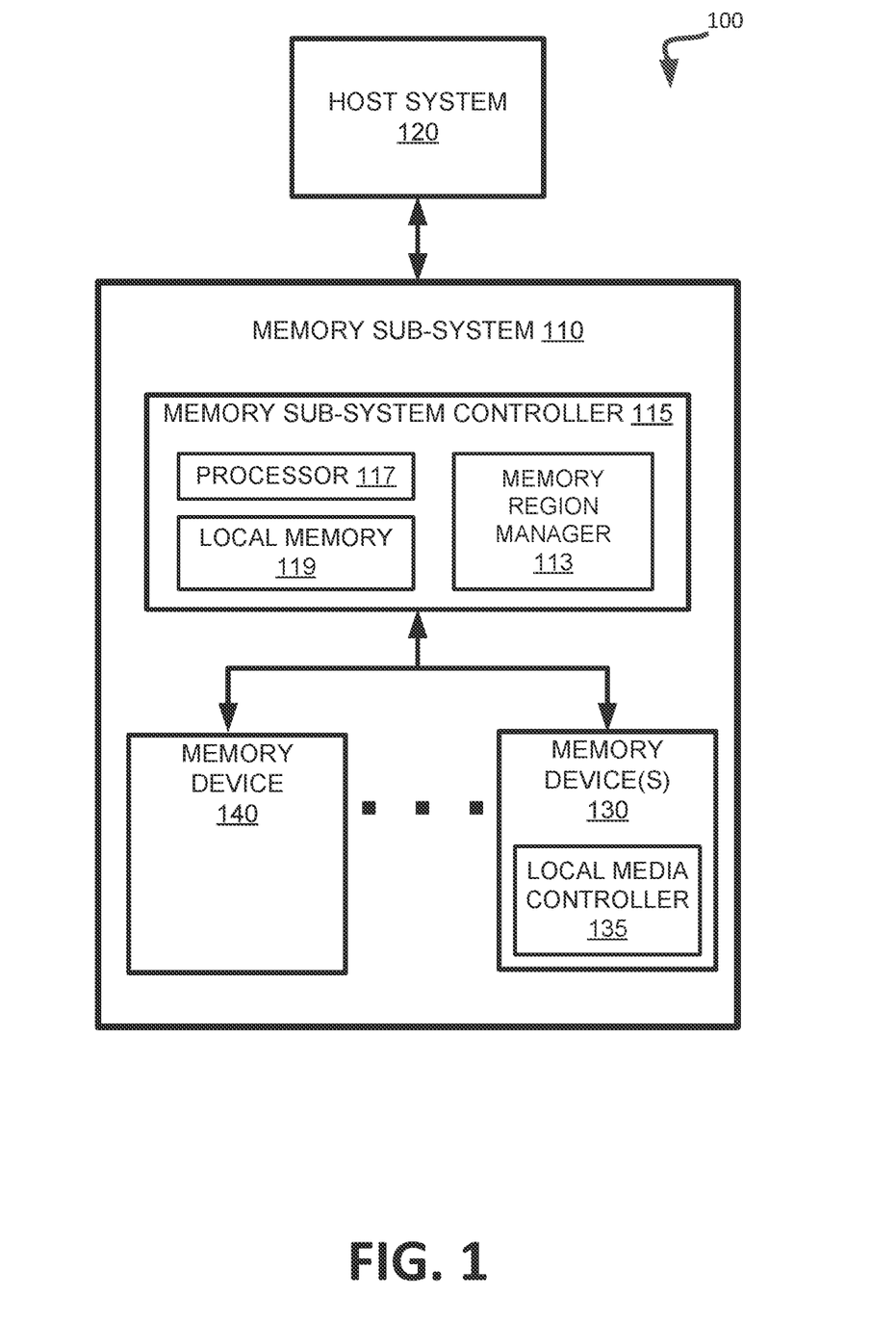
FIG. 1 illustrates an example computing environment that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point type and NAND type memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes memory region manager 113. In one implementation, memory region manager 113 can manage the writing and storing of data across the different regions/portions of memory device 130 and memory device 140. As described above, memory device 130 can include a non-volatile memory device (e.g., NAND) and memory device 140 can include a volatile memory device (e.g., DRAM). In one embodiment, memory device 130 is configured with a zone namespace, and a first portion of memory device 140 is used to store zone namespace metadata corresponding to the zone namespace on memory device 130. Since the zone namespace metadata is relatively small compared to the total capacity of memory device 140, memory region manager 113 can expose the remaining portion (e.g., the portion not storing the zone namespace metadata) to host system 120 as a non-zoned addressable memory region. In one embodiment, memory region manager 113 utilizes the PMR feature to cause the non-zoned addressable memory region (also referred to herein as "PMR free space") to appear as a separate PCIe memory device to host system 120. Accordingly, memory region manager 113 can store host data objects in the zone namespace on memory device 130 and the corresponding host metadata objects in the PMR free space on memory device 140. Once the amount of host metadata on memory device 140 reaches a given threshold, memory region manager 113 can transfer the host metadata to the zone namespace on memory device 130. Further details with regards to the operations of memory region manager 113 are described below.

Figure 2:
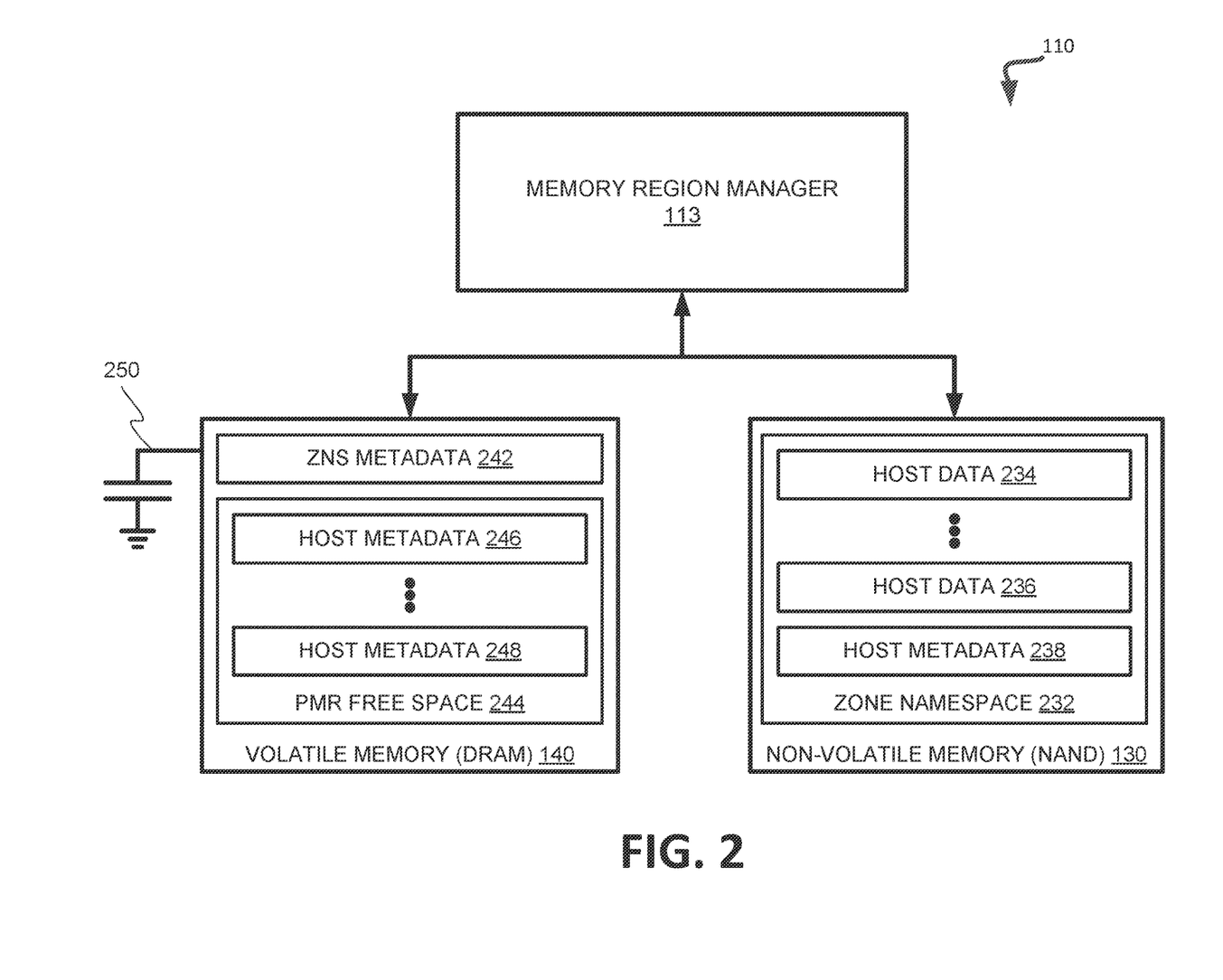
FIG. 2 is a block diagram illustrating operation of a memory region manager performing enhanced filesystem support for a memory sub-system with zone namespace memory in accordance with some embodiments of the present disclosure.

FIG. 2 is a block diagram illustrating operation of a memory region manager 113 performing enhanced filesystem support for a memory sub-system 110 with zone namespace memory in accordance with some embodiments of the present disclosure. In one embodiment, memory region manager 113 is operatively coupled with memory device 130 and memory device 140 via one or more electrical connections (e.g., one or more buses). Non-volatile memory device 130 can be configured with a zone namespace 232. In zone namespace 232, the address space of memory device 130 is divided into zones which allows for more efficient management of data, especially when the capacity of memory device 130 is large. Zone namespace 232 may be optimized to accept writes from host system 120, via memory region manager 113, using a corresponding write size granularity. For example, zone namespace 232 can have an optimal write size that is in the range of approximately 100 KB (e.g., 64 KB, 128 KB, 196 KB). This write size granularity may be different than a write size granularity used by a filesystem of the host system and used to write to volatile memory device 140, which may be for example approximately 4 KB. In addition, in zone namespace 232, writes are performed sequentially starting from the beginning of each zone. Many filesystems utilize a write in place approach (i.e. random write) often with smaller granularity than is optimal for zone namespace 232. In zone namespace 232, however, data within a zone cannot be arbitrarily overwritten. Instead, memory region manager 113 can reset the zone write pointer to delete the data in the zone and can restart writing of data from the beginning of the zone.

Compared to a conventional filesystem, zone namespace 232 can be implemented using a significantly smaller amount of zone namespace metadata 242 (e.g., address mapping tables). Since zone namespace 232 uses a larger write size granularity and enforces sequential writes, the amount of zone namespace metadata 242 required is less than that of a non-zoned memory sub-system of comparable size. Accordingly, less capacity on memory device 140 is needed to maintain the zone namespace metadata 242 for zone namespace 232. For example, if zone namespace 232 has a capacity of 16 TB, zone namespace metadata 242 might be approximately 50 MB. Since memory device 140 can be approximately 1 GB in size or larger, there can be significant unused capacity on memory device 140.

Accordingly, memory region manager 113 can identify the portion of memory device 140 that is storing zone namespace metadata 242, and a remaining portion that is not storing the zone namespace metadata 242. For example, memory region manager 113 can inspect individual segments (e.g., blocks, pages) of the memory device 140 to see which are mapped to data and which are unmapped. Memory region manager 113 can segment the remaining portion of memory device 140, and using the PMR feature for example, expose that remaining portion to host system 120 as a non-zoned addressable memory region. PMR enables the presentation of volatile memory (e.g., DRAM) as persistent memory by virtue of a capacitor 250, battery, or other power source. The filesystem on host system 120 can see the resulting PMR free space 244 (i.e., the non-zoned addressable memory region) as a separate PCIe memory device. Thus, memory region manager 113 can receive host metadata corresponding to host data 234-236 written to non-volatile memory 130, and can write that host metadata to PMR fee space 244 as host metadata objects 246-248. Since PMR free space 244 is unzoned, it can have a different write size granularity than zone namespace 232, and is not subject to the same sequential write requirements. For example, memory region manager 113 can write host metadata objects 246-248 to PMR free space 244 as 4 KB chunks.

In the event of a power failure, the memory sub-system 110 can use the back-up power from capacitor 250 to transfer the host metadata 246-248 from the PMR free space 244 to non-volatile memory 130. When power is restored, the memory sub-system 110 can restore the host metadata 246-248 to the PMR free space 244 by retrieving it from non-volatile memory 130. The filesystem will be mounted and, as part of crash recovery, will check the PMR signature and retrieve all metadata and journals that were previously saved so to be able to restore the entire filesystem. As a result, any processing of the data being performed at the time of power loss can be resumed from the same point once the memory sub-system is rebooted.

In one embodiment, host metadata 246-248 is stored only temporarily in PMR free space 244 on memory device 140. Memory region manager 113 can monitor the amount of host metadata in PMR free space 244 and compare that amount to a threshold. In one embodiment, the threshold is equal to the write granularity of zone namespace 232 on memory device 130. Thus, once the amount of metadata 246-248 in PMR free space 244 (e.g., 4 KB chunks) equals the write granularity of zone namespace 232 (e.g., 128 KB), memory region manager 113 can migrate, copy, write, or otherwise move the host metadata 246-248 to zone namespace 232 where it can be stored as host metadata 238.

Figure 3:
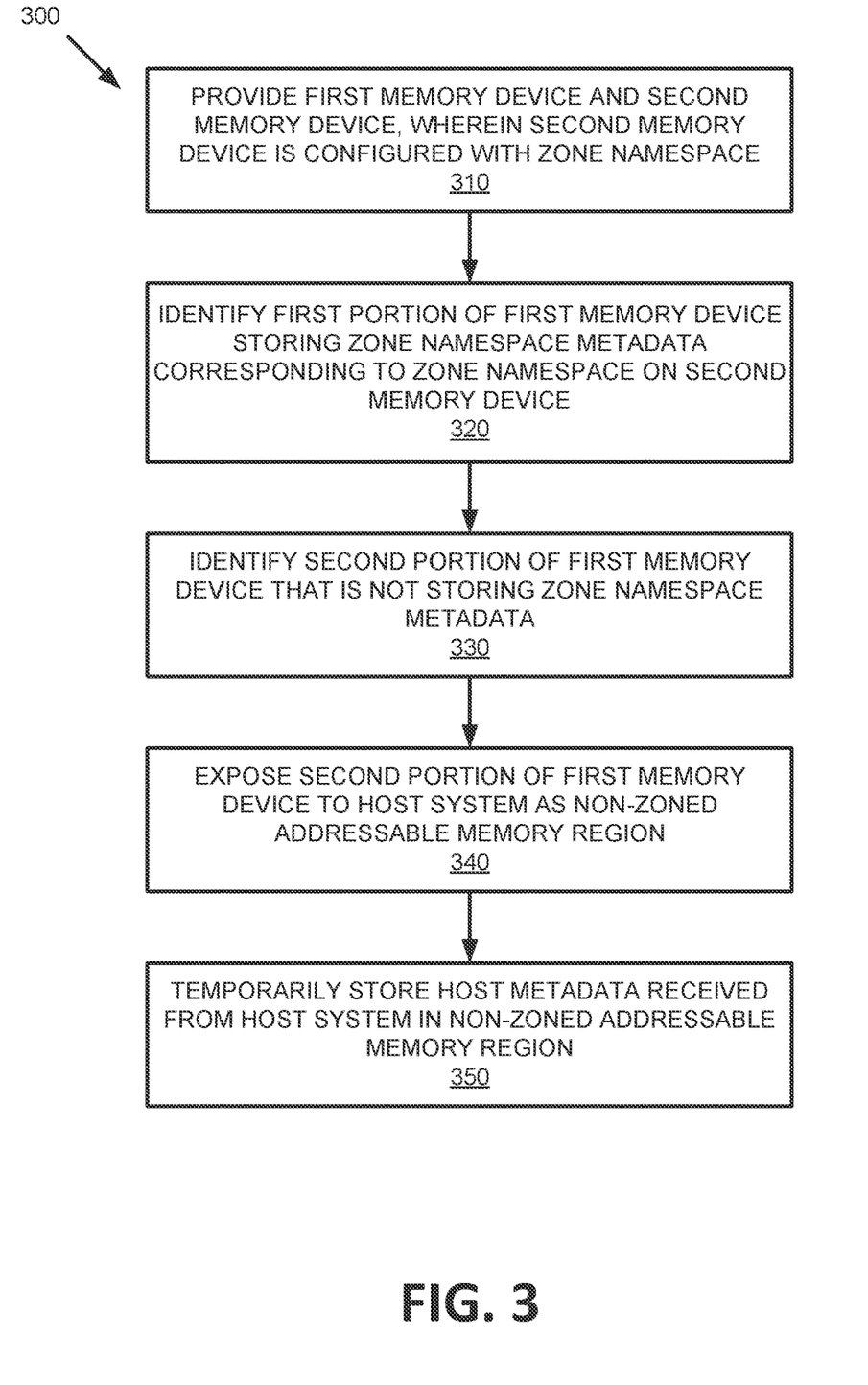
FIG. 3 is a flow diagram of an example method of memory region management for a memory sub-system implementing a zone namespace in accordance with some embodiments of the present disclosure.

FIG. 3 is a flow diagram of an example method of memory region management for a memory sub-system implementing a zone namespace in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by memory region manager 113, as shown in FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic provides a first memory device (e.g., volatile memory device 140) and a second memory device (e.g., non-volatile memory device 130). In one embodiment, the non-volatile memory device 130 is configured with a zone namespace 232. As described above, zone namespace 232 may include a number of separate zones that are each optimized to accept writes from host system 120, via memory region manager 113, using a corresponding write size granularity (e.g., 128 KB). These writes to zone namespace 232 are performed sequentially starting from the beginning of each zone.

At operation 320, the processing logic identifies a first portion of the volatile memory device 140 storing zone namespace metadata 242 corresponding to the zone namespace 232 on non-volatile memory device 130. Since zone namespace 232 uses a larger write size granularity and enforces sequential writes, the amount of zone namespace metadata 242 required is less than that of a non-zoned memory sub-system of comparable size. For example, if zone namespace 232 has a capacity of 16 TB, zone namespace metadata 242 might be approximately 50 MB. In one embodiment, memory region manager 113 can inspect individual segments (e.g., blocks, pages) of the memory device 140 to see which are mapped to data (i.e., zone namespace metadata 242) and which are unmapped.

At operation 330, the processing logic identifies a second portion of the volatile memory device 140 that is not storing the zone namespace metadata 242. Since memory device 140 can be approximately 1 GB in size or larger, there can be significant unused capacity on memory device 140. Accordingly, memory region manager 113 can identify the remaining portion of memory device 140 that is not storing the zone namespace metadata 242. Memory region manager 113 can identify any unmapped segments of the memory device 140 via the same inspection process used above.

At operation 340, the processing logic exposes the second portion of the volatile memory device 140 to host system 120 as a non-zoned addressable memory region. In one embodiment, memory region manager 113 uses the PMR feature to expose the non-zoned addressable memory region, which can be referred to as PMR free space 244. PMR enables the presentation of a portion of the memory device 140 (i.e., volatile memory) as persistent memory by virtue of a capacitor 250, battery, or other power source. The filesystem on host system 120 can see the resulting PMR free space 244 (i.e., the non-zoned addressable memory region) as a separate PCIe memory device.

At operation 350, the processing logic temporarily stores host metadata 246-248 received from host system 120 in the PMR free space 244. For example, memory region manager 113 can receive host metadata corresponding to host data 234-236 written to non-volatile memory 130, and can write that host metadata to PMR fee space 244 as host metadata objects 246-248. Since PMR free space 244 is unzoned, it can have a different write size granularity than zone namespace 232, and is not subject to the same sequential write requirements. For example, memory region manager 113 can write host metadata objects 246-248 to PMR free space 244 as 4 KB chunks. As described in more detail with respect to FIG. 4, memory region manager 113 can monitor the amount of host metadata in PMR free space 244 and compare that amount to a threshold. In one embodiment, the threshold is equal to the write granularity of zone namespace 232 on memory device 130. Thus, once the amount of metadata 246-248 in PMR free space 244 (e.g., 4 KB chunks) equals the write granularity of zone namespace 232 (e.g., 128 KB), memory region manager 113 can migrate, copy, write, or otherwise move the host metadata 246-248 to zone namespace 232 where it can be stored as host metadata 238.

Figure 4:
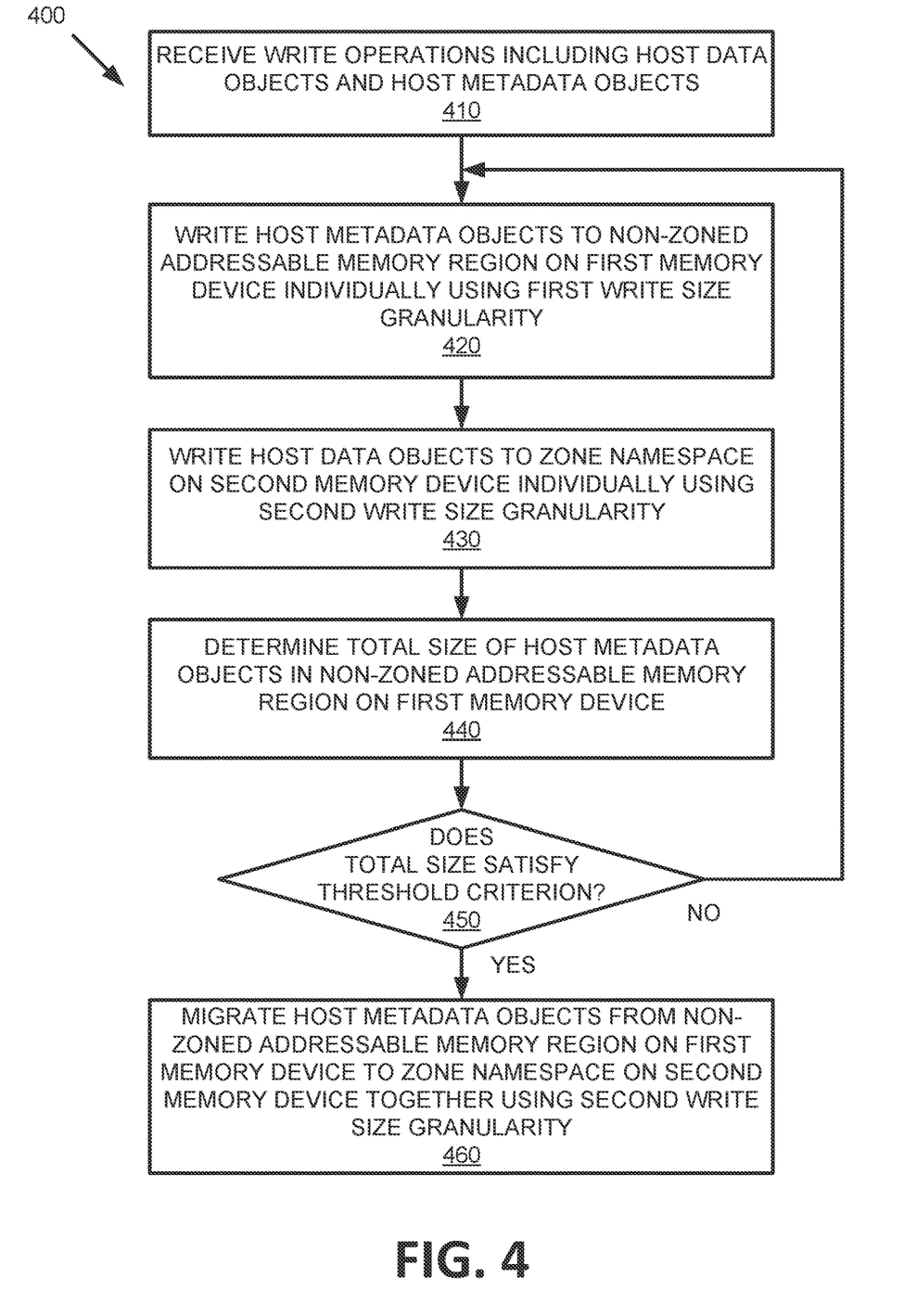
FIG. 4 is a flow diagram of an example method of managing host access requests in a memory sub-system implementing a zone namespace for a non-volatile memory device in accordance with some embodiments of the present disclosure.

FIG. 4 is a flow diagram of an example method of managing host access requests in a memory sub-system implementing a zone namespace for a non-volatile memory device in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by memory region manager 113, as shown in FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives write operations from host system 120 including host data objects 234-236 and host metadata objects 246-248. In one embodiment, memory region manager 113 receives the write operation from host system 120 with instructions to store the corresponding data in memory sub-system 110. In one embodiment, the host data objects 234-236 may have a corresponding write size granularity (e.g., 128 KB) and the host metadata objects 246-248 may have a different write size granularity (e.g., 4 KB). The host metadata objects 246-248 can each correspond to one of one the host data objects 234-236. For example, the host metadata objects 246-248 can include metadata information such as a name of a file, a length of the file, a creator of the file, a creation time/date of the file, etc., of one or more of host data objects 234-236.

At operation 420, the processing logic writes the host metadata objects 246-248 to PMR free space 244 on volatile memory device 140 individually using a first write size granularity. In one embodiment, memory region manager 113 can write the host metadata objects 246-248 to PMR fee space 244 in 4 KB chunks. Since PMR free space 244 is a non-zoned addressable memory region, the host metadata objects 246-248 need not be written using a larger write size granularity or in sequential fashion as required by zone namespace 232. In one embodiment, the PMR free space 244 presents as persistent memory by virtue of a capacitor 250, battery, or other power source.

At operation 430, the processing logic writes the host data objects 234-236 to zone namespace 232 on non-volatile memory device 130 individually using a second write size granularity. In one embodiment, the second write size granularity (e.g., 128 KB) is optimized for the zone namespace 232 and memory region manager 113 writes host data objects 234-236 to zone namespace 232 sequentially.

At operation 440, the processing logic determines a total size of all of the host metadata objects 246-248 in PMR free space 244 on volatile memory device 140. Although each individual host metadata object may be 4 KB in size for example, in one embodiment, memory region manager 113 can determine the total size of all of the host metadata objects 246-248. For example, this can include determining the number of host metadata objects multiplied by the size of each host metadata object, a percentage or portion of the PMR free space 244 that is full of host metadata objects compared to a portion that is empty, or some other process for determining the total size.

At operation 450, the processing logic determines whether the total size of all of the host metadata objects 246-248 satisfies a threshold criterion. In one embodiment, memory region manager 113 can monitor the total size of host metadata in PMR free space 244 and compare that amount to a threshold. In one embodiment, the threshold is equal to the write granularity of zone namespace 232 on memory device 130. In one embodiment, memory region manager 113 determines that the total size satisfies the threshold criterion if the total size is greater than or equal to the threshold (e.g., 128 KB). Conversely, memory region manager 113 determines that the total size does not satisfy the threshold criterion if the total size is less than the threshold.

If the total size does not satisfy the threshold criterion, the processing logic returns to operation 420. If, however, the total size does satisfy the threshold criterion, at operation 460, the processing logic migrates the host metadata objects 246-248 from PMR free space 244 on volatile memory device 140 to the zone namespace 232 on non-volatile memory device 130 together using the second write size granularity. In one embodiment, memory region manager 113 can migrate, copy, write, or otherwise move the host metadata objects 246-248 to zone namespace 232 where it can be stored as host metadata 238. Memory region manager 113 can combine the individual host metadata objects 246-248 (e.g., 4 KB each) together into a single host metadata object 238 (e.g., 128 KB in size). If some host metadata objects remain in PMR free space 244, memory region manager 113 can maintain those metadata objects in PMR free space 244 until the total size again satisfies the threshold criterion.

Figure 5:
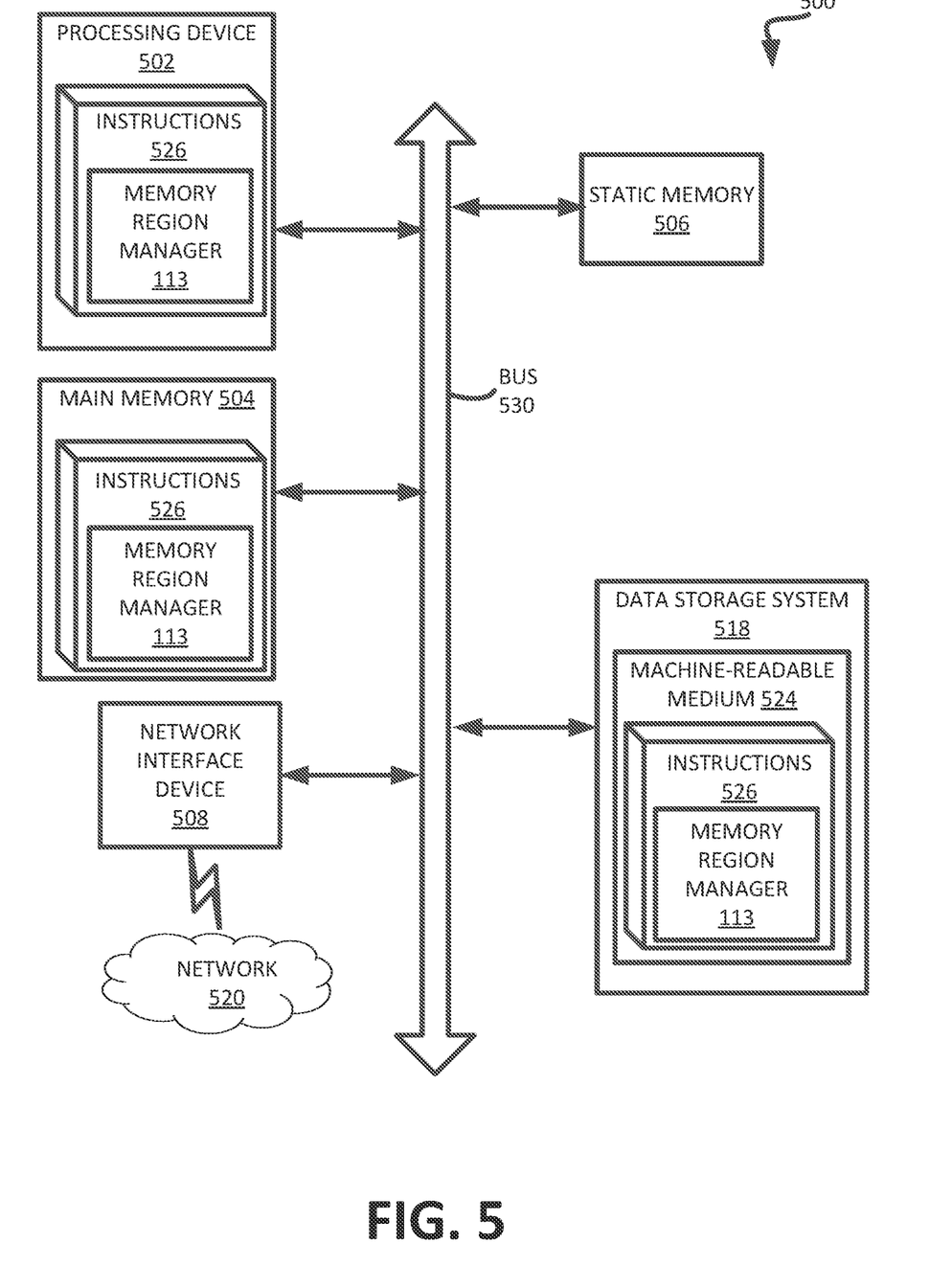
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to memory region manager 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to memory region manager 113 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a plurality of memory devices comprising a first memory device and a second memory device;
a processing device, operatively coupled with the plurality of memory devices, to perform operations comprising:
determining that a total size of a plurality of host metadata objects in a portion of the first memory device exposed to a host system as a non-zoned addressable memory region satisfies a threshold criterion associated with a zone namespace write size granularity for a zone namespace on the second memory device, the zone namespace to enforce sequential writes from the host system at the zone namespace write size granularity that is larger than a write size granularity of the host system, wherein a remaining portion of the first memory device is to store zone namespace metadata corresponding to the zone namespace on the second memory device, wherein a size of the zone namespace metadata is reduced in view of the larger zone namespace write size granularity of the zone namespace, and wherein the remaining portion of the first memory device storing the zone namespace metadata is smaller than the portion of the first memory device storing the host metadata objects; and
moving the plurality of host metadata objects from the non-zoned addressable memory region on the first memory device to the zone namespace on the second memory device using the zone namespace write size granularity.

2. The system of claim 1, wherein the portion of the first memory device is exposed to the host computing system using a persistent memory region (PMR) feature, and wherein the portion of the first memory device comprises PMR free space configured to receive the host metadata objects from the host system.

3. The system of claim 1, wherein the first memory device comprises volatile memory with a backup power source, and wherein the second memory device comprises non-volatile memory.

4. The system of claim 1, wherein the non-zoned addressable memory region accepts write-in-place operations from the host system.

5. The system of claim 1, wherein the zone namespace on the second memory device accepts sequential write operations from the host system.

6. The system of claim 1, wherein the processing device to perform further operations comprising:
receiving a plurality of write operations comprising a plurality of host data objects; and
writing each of the plurality of host data objects to the zone namespace on the second memory device individually using the zone namespace write size granularity.

7. The system of claim 1, wherein the processing device to perform further operations comprising:
receiving a plurality of write operations comprising a plurality of host metadata objects; and
writing each of the plurality of host metadata objects to the non-zoned addressable memory region on the first memory device individually using the write size granularity of the host system.

8. A method comprising:
determining that a total size of a plurality of host metadata objects in a portion of a first memory device exposed to a host system as a non-zoned addressable memory region satisfies a threshold criterion associated with a zone namespace write size granularity for a zone namespace on a second memory device, the zone namespace to enforce sequential writes from the host system at the zone namespace write size granularity that is larger than a write size granularity of the host system, wherein a remaining portion of the first memory device is to store zone namespace metadata corresponding to the zone namespace on the second memory device, wherein a size of the zone namespace metadata is reduced in view of the larger zone namespace write size granularity of the zone namespace, and wherein the remaining portion of the first memory device storing the zone namespace metadata is smaller than the portion of the first memory device storing the host metadata objects; and
moving the plurality of host metadata objects from the non-zoned addressable memory region on the first memory device to the zone namespace on the second memory device using the zone namespace write size granularity.

9. The method of claim 8, wherein the portion of the first memory device is exposed to the host computing system using a persistent memory region (PMR) feature, and wherein the portion of the first memory device comprises PMR free space configured to receive the host metadata objects from the host system.

10. The method of claim 8, wherein the first memory device comprises volatile memory with a backup power source, and wherein the second memory device comprises non-volatile memory.

11. The method of claim 8, wherein the non-zoned addressable memory region accepts write-in-place operations from the host system.

12. The method of claim 8, wherein the zone namespace on the second memory device accepts sequential write operations from the host system.

13. The method of claim 8, further comprising:
receiving a plurality of write operations comprising a plurality of host data objects; and
writing each of the plurality of host data objects to the zone namespace on the second memory device individually using the zone namespace write size granularity.

14. The method of claim 8, further comprising:
receiving a plurality of write operations comprising a plurality of host metadata objects; and
writing each of the plurality of host metadata objects to the non-zoned addressable memory region on the first memory device individually using the write size granularity of the host system.

15. A non-transitory computer-readable storage medium comprising instructions that, when executed by a processing device, cause the processing device to perform operations comprising:
determining that a total size of a plurality of host metadata objects in a portion of a first memory device exposed to a host system as a non-zoned addressable memory region satisfies a threshold criterion associated with a zone namespace write size granularity for a zone namespace on a second memory device, the zone namespace to enforce sequential writes from the host system at the zone namespace write size granularity that is larger than a write size granularity of the host system, wherein a remaining portion of the first memory device is to store zone namespace metadata corresponding to the zone namespace on the second memory device, wherein a size of the zone namespace metadata is reduced in view of the larger zone namespace write size granularity of the zone namespace, and wherein the remaining portion of the first memory device storing the zone namespace metadata is smaller than the portion of the first memory device storing the host metadata objects; and moving the plurality of host metadata objects from the non-zoned addressable memory region on the first memory device to the zone namespace on the second memory device using the zone namespace write size granularity.

16. The non-transitory computer-readable storage medium of claim 15, wherein the portion of the first memory device is exposed to the host computing system using a persistent memory region (PMR) feature, and wherein the portion of the first memory device comprises PMR free space configured to receive the host metadata objects from the host system.

17. The non-transitory computer-readable storage medium of claim 15, wherein the first memory device comprises volatile memory with a backup power source, and wherein the second memory device comprises non-volatile memory.

18. The non-transitory computer-readable storage medium of claim 15, wherein the non-zoned addressable memory region accepts write-in-place operations from the host system, and wherein the zone namespace on the second memory device accepts sequential write operations from the host system.

19. The non-transitory computer-readable storage medium of claim 15, further comprising:

receiving a plurality of write operations comprising a plurality of host data objects; and writing each of the plurality of host data objects to the zone namespace on the second memory device individually using the zone namespace write size granularity.

20. The non-transitory computer-readable storage medium of claim 15, further comprising:

receiving a plurality of write operations comprising a plurality of host metadata objects; and writing each of the plurality of host metadata objects to the non-zoned addressable memory region on the first memory device individually using the write size granularity of the host system.

* * * * *